(12) United States Patent
Klinkner

(10) Patent No.: US 8,726,878 B2
(45) Date of Patent: May 20, 2014

(54) INTERNAL COMBUSTION ENGINE

(71) Applicant: GE Jenbacher GmbH & Co OG, Jenbach (AT)

(72) Inventor: Martin Klinkner, Wiesing (AT)

(73) Assignee: GE Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 13/920,482

(22) Filed: Jun. 18, 2013

(65) Prior Publication Data

US 2013/0276745 A1    Oct. 24, 2013

Related U.S. Application Data

(63) Continuation of application No. PCT/AT2011/000451, filed on Nov. 10, 2011.

(30) Foreign Application Priority Data

Dec. 27, 2010  (AT) .................................. 2143/2010

(51) Int. Cl.
*F02B 19/18*    (2006.01)

(52) U.S. Cl.
USPC ........... 123/293; 123/254; 123/267; 123/268; 123/281

(58) Field of Classification Search
USPC .......... 123/253, 254, 266–268, 281, 286, 293
See application file for complete search history.

(56) References Cited

U.S. PATENT DOCUMENTS

| | | | | |
|---|---|---|---|---|
| 4,416,228 A | * | 11/1983 | Benedikt et al. | 123/268 |
| 4,646,695 A | * | 3/1987 | Blackburn | 123/256 |
| 5,067,458 A | * | 11/1991 | Bailey | 123/292 |
| 5,105,780 A | * | 4/1992 | Richardson | 123/263 |
| 6,854,439 B2 | * | 2/2005 | Regueiro | 123/263 |

(Continued)

FOREIGN PATENT DOCUMENTS

| | | |
|---|---|---|
| DE | 25 37 001 | 12/1976 |
| DE | 37 09 967 | 10/1988 |

(Continued)

OTHER PUBLICATIONS

International Search Report (ISR) issued Feb. 22, 2012 in International (PCT) Application No. PCT/AT2011/000451.

(Continued)

*Primary Examiner* — Erick Solis
(74) *Attorney, Agent, or Firm* — Wenderoth, Lind & Ponack, L.L.P.

(57) ABSTRACT

An internal combustion engine includes a cylinder head having a cylinder head base, a cylinder wall, and a piston which is movable along a cylinder axis and has a piston crown. A main combustion chamber is formed between the cylinder head base, the cylinder wall, and the piston crown. A precombustion chamber is inserted into a bore of the cylinder head and is fixed relative to the bore in the circumferential direction of the bore. The axis of the bore is at least substantially parallel to the cylinder axis, and a precombustion-type combustion chamber is formed in the precombustion chamber. At least one ring of transfer openings connects the precombustion-type combustion chamber to the main combustion chamber, and in each case, the angle which the transfer opening encloses with the cylinder axis differs for at least two transfer openings of the at least one ring.

6 Claims, 4 Drawing Sheets

(56) References Cited

U.S. PATENT DOCUMENTS

| | | | |
|---|---|---|---|
| RE41,344 E | * | 5/2010 | Funaki et al. ................ 123/263 |
| 2003/0213461 A1 | | 11/2003 | Regueiro |
| 2012/0060791 A1 | | 3/2012 | Woerner et al. |

FOREIGN PATENT DOCUMENTS

| | | |
|---|---|---|
| DE | 10 2009 016 461 | 10/2010 |
| JP | 6-30433 | 4/1994 |
| JP | 2001-3753 | 1/2001 |
| JP | 2009-270540 | 11/2009 |
| WO | 2009/130376 | 10/2009 |
| WO | 2010/112279 | 10/2010 |

OTHER PUBLICATIONS

Austrian Patent Office Search Report (ASR) issued Jun. 15, 2011 in Austrian Patent Application No. A 2143/2010.

* cited by examiner

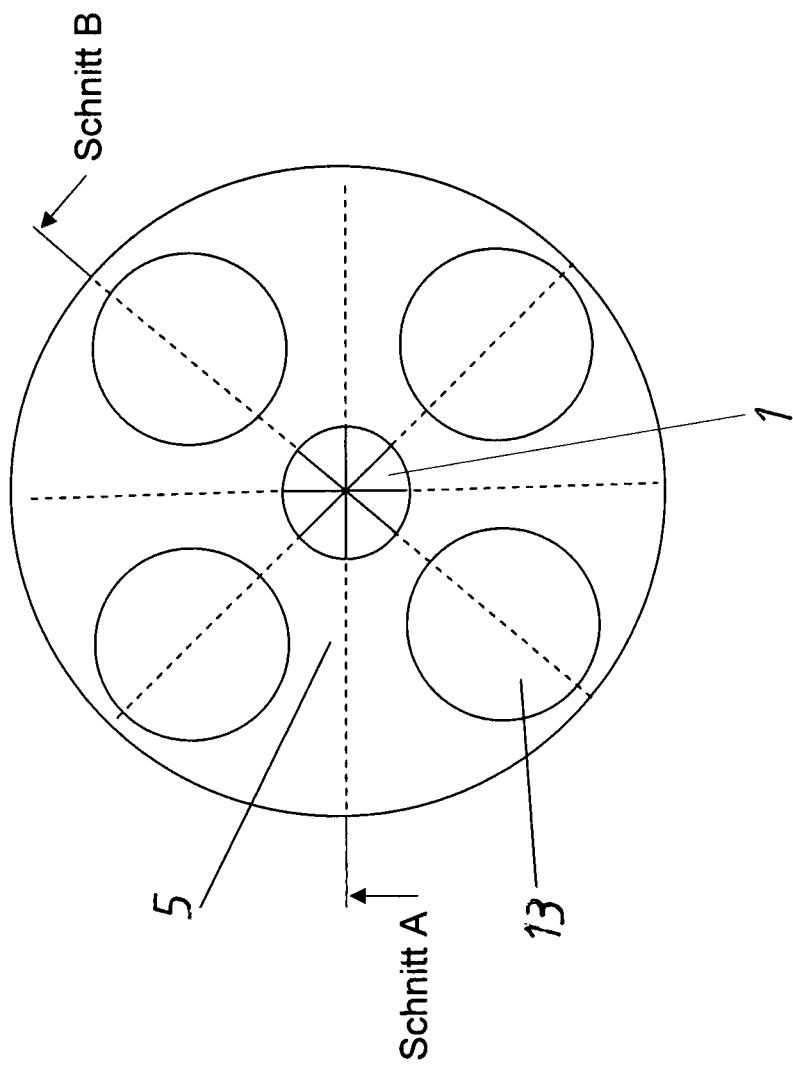

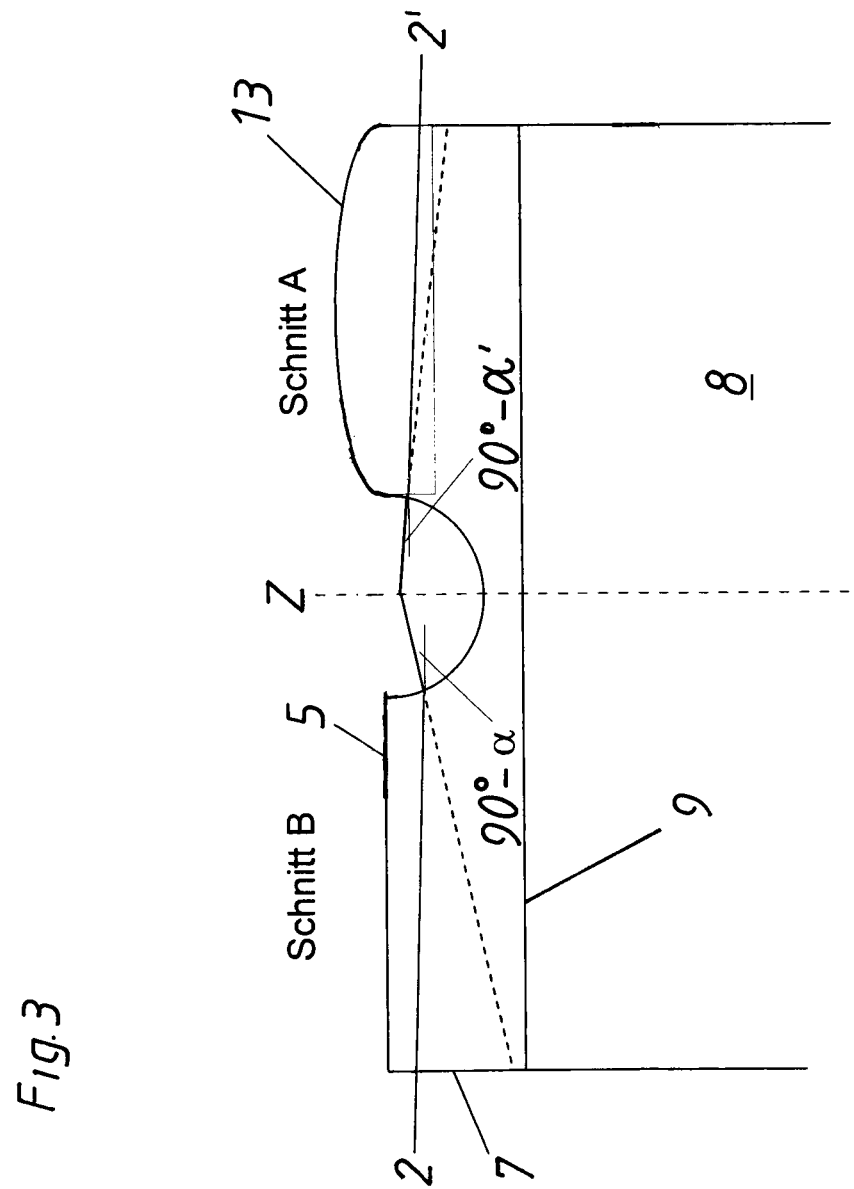

US 8,726,878 B2
1

INTERNAL COMBUSTION ENGINE

BACKGROUND OF THE INVENTION

The invention concerns an internal combustion engine including a cylinder head having a cylinder head base, a cylinder wall, and a piston which is movable along a cylinder axis and which has a piston crown. A main combustion chamber is formed between the cylinder head base, the cylinder wall, and the piston crown. A pre-chamber is fitted into a bore in the cylinder head and is fixed relative to the bore in the peripheral direction of the bore, and the axis of the bore is at least substantially parallel to the cylinder axis and a pre-chamber combustion chamber is formed in the pre-chamber. At least one ring of transfer openings connects the pre-chamber combustion chamber to the main combustion chamber.

So-called pre-chamber-ignition internal combustion engines of the above-described kind are sufficiently known. Ignition flares issuing from the transfer openings serve to reliably ignite a mixture in the main combustion chamber.

In many pre-chambers known at the present time, it is not possible to predetermine the exact installation position as the pre-chambers are screwed in place and the precise angular position in the peripheral direction relative to the bore in the cylinder head cannot be established by way of a screwthread. However, internal combustion engines of the general kind set forth are already known, in which the pre-chamber is fixed relative to the bore in the cylinder head in the peripheral direction of the bore (see for example DE 37 09 976 A1).

Internal combustion engines of the general kind set forth suffer from a problem that the ignition flares do not optimally involve the volume of the main combustion chamber, and thus rapid combustion is not guaranteed. If the attempt is made to make the ignition flares larger in size, that also entails a severe thermal loading on the cylinder head base and the piston crown.

SUMMARY OF THE INVENTION

The object of the invention is to develop an internal combustion engine of the general kind set forth in such a way that rapid combustion is guaranteed, without excessively thermally loading the cylinder head base or the piston crown.

That object is attained by an internal combustion engine having the features described below.

Because the individual transfer openings do not include the same respective angle with the cylinder axis, it is possible for the angle that each transfer opening respectively includes with the cylinder axis to be selected for each transfer opening so that, in operation of the internal combustion engine, the ignition flares issuing from the transfer openings are at a maximum spacing from the cylinder head base and the piston crown. That provides, on the one hand, that the thermal loading on the cylinder head base and the piston crown is minimized. On the other hand, in that way a maximum volume of the main combustion chamber is involved, which ensures rapid combustion.

In addition, the geometry of the transfer openings (for example diameter and shape) can be varied. In that way, it is possible to adapt the size and the impulse of the respective ignition flares to local demands.

It will be appreciated that a prerequisite for this measure is that the pre-chamber is fixed in its peripheral direction in the bore in the cylinder head (that is to say, it is in a predetermined angular position). Otherwise, it is in fact not possible for the angles of the transfer openings to be matched to the respective geometrical aspect of the main combustion chamber. Particularly preferably, the internal combustion engine is in the form of a stationary gas engine which can be coupled to a generator for power generation.

BRIEF DESCRIPTION OF THE DRAWINGS

An embodiment by way of example of the invention will now be described with reference to the Figures and the specific description hereinafter. In the drawings:

FIG. 2 shows a plan view of the cylinder head base of the internal combustion engine shown in FIG. 1, FIG. 3 is a sectional view along section lines A and B in FIG. 2, FIGS. 4a and 4b show a realistic plan view of a cylinder head base of an internal combustion engine according to the invention and a detail view thereof.

DETAILED DESCRIPTION OF THE INVENTION

Figure 1:
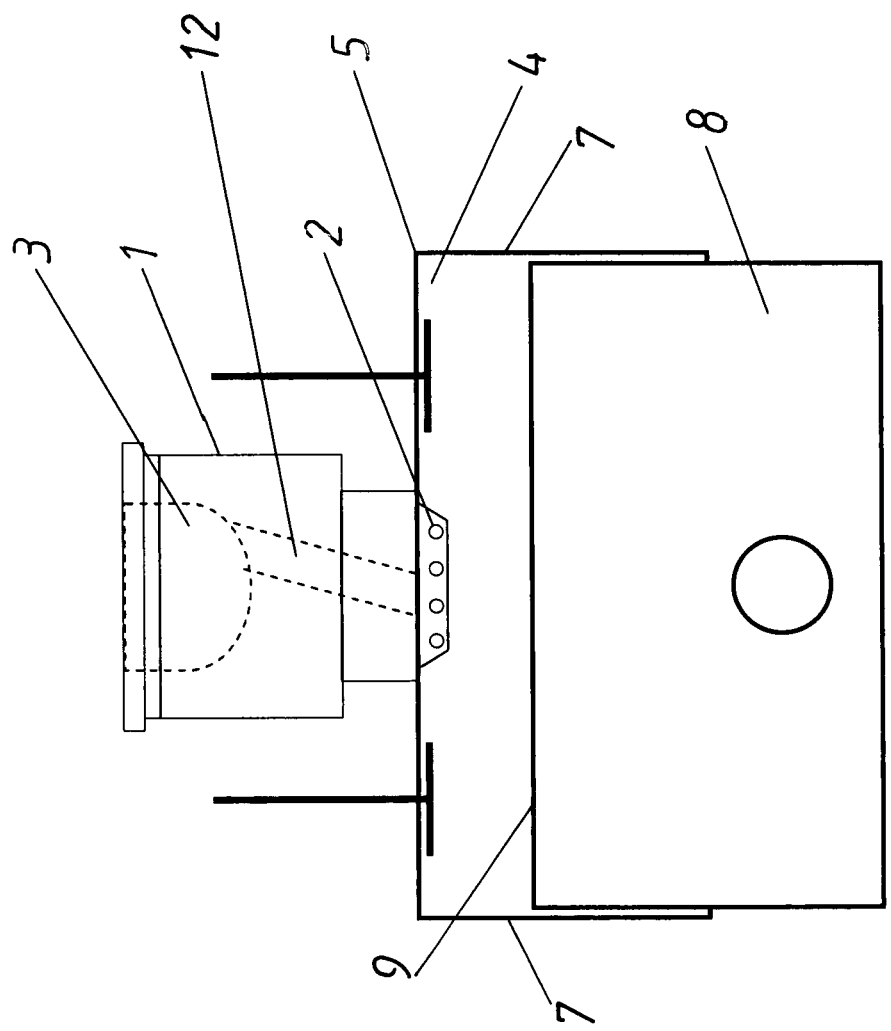
FIG. 1 diagrammatically shows a portion of an internal combustion engine according to the invention in the part relevant to the invention.

FIG. 1 shows a main combustion chamber 4 of an internal combustion engine according to the invention which, in reality, naturally usually has more than one main combustion chamber 4. The main combustion chamber 4 is formed by a piston crown 9 of a piston 8, the cylinder walls 7, and the cylinder head base 5 of a cylinder head 6. It is further possible to see a pre-chamber 1 in which there is formed a pre-chamber combustion chamber 3 which is in communication with the main combustion chamber 4 by way of a passage 12 with transfer openings 2, 2' (only one transfer opening 2 is shown in FIG. 1).

As can be seen from FIG. 3, the spacing between the cylinder head base 5 and the piston crown 9 is not equal in size everywhere in the main combustion chamber. A further reason for a varying spacing can be the configuration of the piston which can differ from a rotationally symmetrical shape (for example, a heart-shaped piston and various recessed-crown pistons).

According to the invention, the transfer openings 2, 2' do not all include the same angle α with the cylinder axis Z (see FIG. 3). The angle α, α' for each transfer opening 2, 2' is selected so that the spacing of the ignition flares issuing from the transfer openings 2, 2' in operation of the internal combustion engine relative to the cylinder head base 5 and the piston crown 9 respectively is at a maximum. That takes account of the fact that, in the illustrated embodiment, the spacing is at the greatest in the region of the valve connecting crosspieces as the valve crosspieces are set back in recesses 13 and the valves terminate flush.

For reasons of clarity, the Figures always show the angles 90° minus α and 90° minus a' respectively, instead of α and α' respectively.

For the sake of better understanding of the diagrammatic views in FIGS. 1 through 3, FIGS. 4 and 5 show a more realistic view of an embodiment according to the invention. As is clear from FIGS. 4a-5b, the central longitudinal axis of the pre-chamber combustion chamber is coaxial with the central longitudinal axis of the main combustion chamber and parallel (or even coaxial) with the cylinder axis. It can be seen in this embodiment that there is a ring of a total of eight transfer openings 2, 2'. Transfer openings 2, 2', which occur in succession in the peripheral direction, respectively, involve a different angle α, α'. Naturally, it would also be possible to arrange not just a ring of transfer openings 2, 2', but also a further such ring, which in fact could be appropriate primarily in relation to very large combustion chambers 4.

Figure 4A:
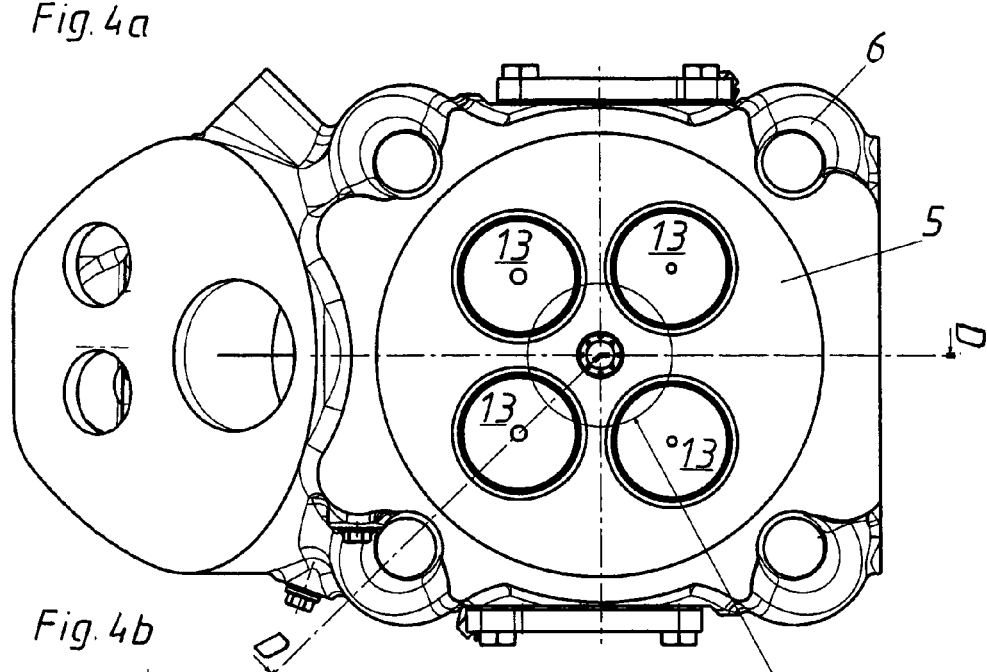
Figure 4B:
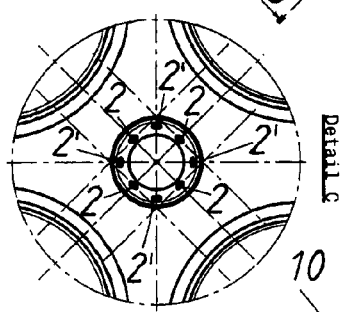

As also illustrated in FIGS. 4a-5b, the transfer openings 2 are located at (closest to) the recesses 13 for the valve seats, while the transfer openings 2' are located distant from (between) the recesses 13 (see, in particular, FIG. 4a, detail view 4b, and cross-section 5a taken through line D-D in FIG. 4a). It can therefore also be seen from these Figures, and particularly from the detail views of FIGS. 4b and 5b, that the angles α of the transfer openings 2 located at (closest to) the recesses 13 are greater than the angles α of the transfer openings 2' located distant from (between) the recesses 13.

Figure 5A:
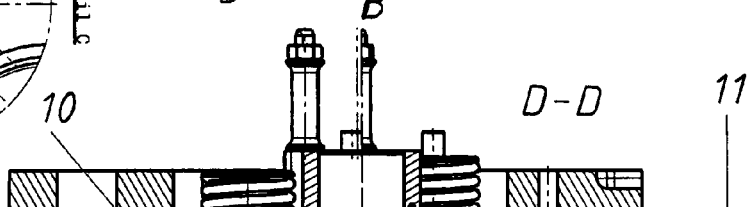
FIGS. 5a and 5b show a sectional view along the line D-D in FIG. 4a and a detail view of the pre-chamber (according to the invention) with transfer openings.

The view of an example as to how the pre-chamber 1 can be fixed in the peripheral direction of the bore 10 is also of interest in FIG. 5a, more specifically in this embodiment by positioning pins 11. Alternatively, it would also be possible to provide that the pre-chamber 1 is clamped in the bore 10, welded therein, or fixed by otherwise using a suitable fixing method which permits assembly in a predetermined angular position.

Figure 5B:
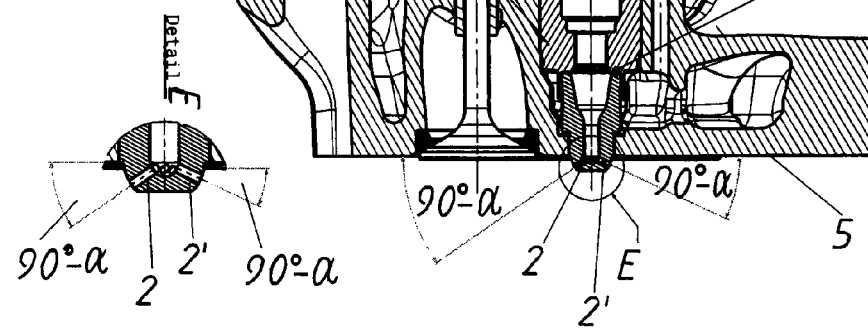

FIG. 5b shows the part of the pre-chamber according to the invention, that projects into the main combustion chamber, showing two transfer openings 2, 2' involving different angles α, α'.

FIG. 1 shows an asymmetric pre-chamber 1 while the other Figures show symmetrical pre-chambers 1. The invention can be applied in relation to both kinds of pre-chambers 1.

The invention claimed is:

1. An internal combustion engine comprising:
    a cylinder head having a cylinder head base, a cylinder wall, and a piston movable along a cylinder axis and having a piston crown, a main combustion chamber being formed between said cylinder head base, said cylinder wall, and said piston crown, said cylinder head base having recesses for allowing valve connecting crosspieces to be set back with respect to said cylinder head base;
    a pre-chamber fitted into a bore in said cylinder head and fixed relative to said bore in a peripheral direction of said bore, a longitudinal axis of said bore being substantially parallel to said cylinder axis, a pre-chamber combustion chamber being formed in said pre-chamber; and
    a ring of transfer openings connecting said pre-chamber combustion chamber to said main combustion chamber, each of said transfer openings forming an angle with respect to said cylinder axis, said angle of each of said transfer openings located at a respective one of said recesses being greater than said angle of each of said transfer openings located distant from said recesses.

2. The internal combustion engine of claim 1, wherein at least two of said transfer openings of said ring have different geometries.

3. The internal combustion engine of claim 1, wherein said ring of transfer openings includes a total of eight transfer openings.

4. The internal combustion engine of claim 3, wherein said cylinder head base has a total of four recesses for allowing valve connecting crosspieces to be set back with respect to said cylinder head base, a first group of four of said eight transfer openings each being located at a respective one of said recesses, and a second group of four of said eight transfer openings each being located between a respective pair of said recesses.

5. The internal combustion engine of claim 1, wherein said cylinder head base has a total of four recesses for allowing valve connecting crosspieces to be set back with respect to said cylinder head base.

6. The internal combustion engine of claim 1, wherein a central longitudinal axis of said pre-chamber combustion chamber is parallel with a central longitudinal axis of said main combustion chamber and parallel to said cylinder axis.

* * * * *